Figure 3:
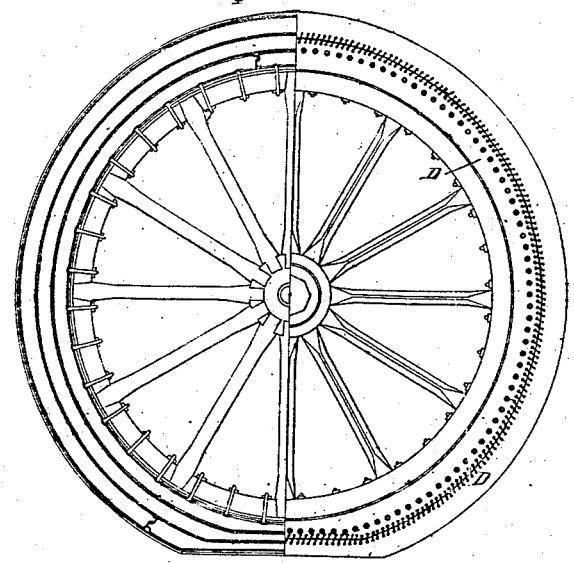
Figure 4:
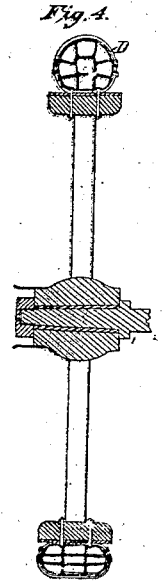
Figure 6:
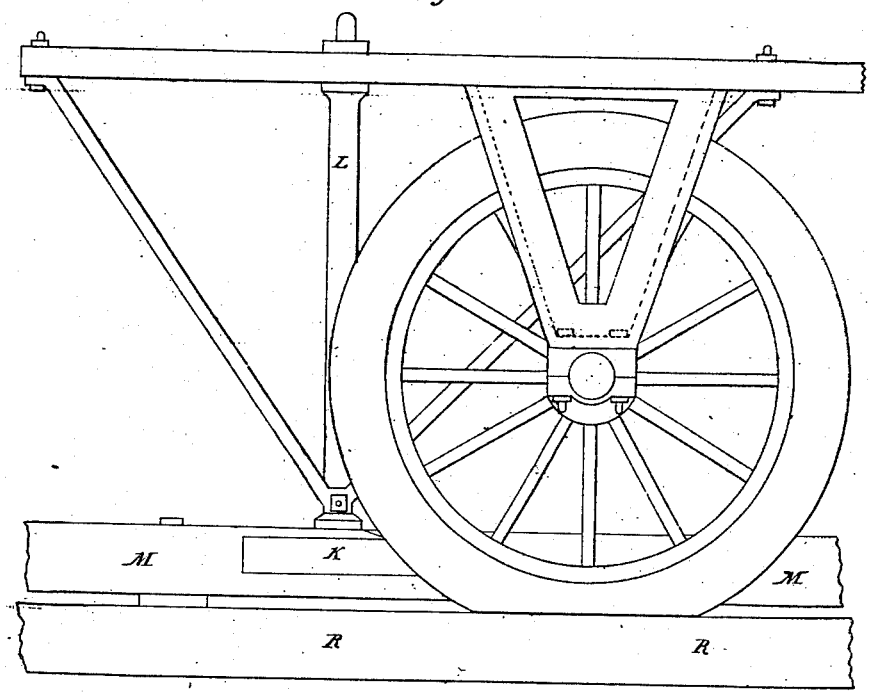

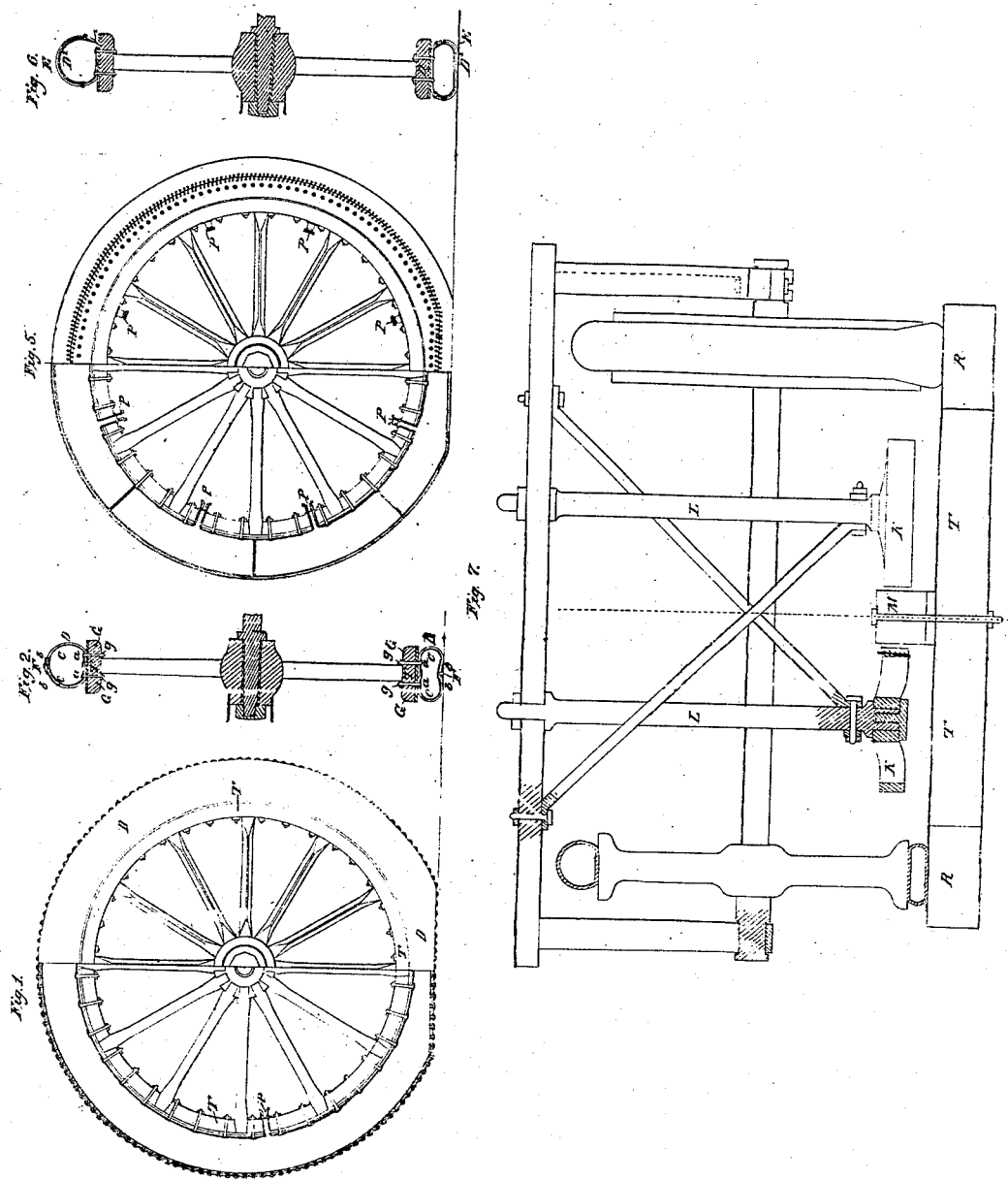

R. W. THOMSON.
CARRIAGE WHEEL, &c.

No. 5,104.

Patented May 8, 1847.

UNITED STATES PATENT OFFICE.

ROBERT W. THOMSON, OF ADAM STREET, ADELPHI, COUNTY OF MIDDLESEX, ENGLAND.

IMPROVEMENT IN CARRIAGE-WHEELS, &c.

Specification forming part of Letters Patent No. 5,104, dated May 8, 1847.

*To all whom it may concern:*

Be it known that I, ROBERT WILLIAM THOMSON, civil engineer, of Adam Street, Adelphi, in the county of Middlesex, England, a subject of the Queen of Great Britain, have invented or discovered a new and useful Improvement in Carriage-Wheels, which is also applicable to other rolling bodies; and I, the said ROBERT WILLIAM THOMSON, do hereby declare the nature of the invention and the manner in which the same is to be performed in and by the following statement thereof—that is to say:

The nature of my said invention consists in the application of elastic bearings round the tires of the wheels of carriages for the purpose of lessening the power required to draw the carriages, rendering their motion easier, and diminishing the noise they make when in motion. I prefer employing for the purpose a hollow belt composed of some air and water tight material, such as sulphurized caoutchouc or gutta-percha, and inflating it with air, whereby the wheels will in every part of their revolution present a cushion of air to the ground or rail or track on which they run.

Figure I is a side view of a wheel of this description, shown partly in section.

The tire and felly T T are made much broader than usual and project considerably at both sides beyond the supporting-spokes, as shown at T T in the cross-section of the wheel given in Fig. II.

The elastic belt is made as follows: A number of folds of canvas saturated and covered on both sides with sulphurized india-rubber or gutta-percha in a state of solution are laid one upon the other and each fold connected to the one immediately below it by a solution of india-rubber or gutta-percha or other suitable cement. The belt thus formed is then sulphurized by immersion in melted sulphur or exposure to the fumes of burning sulphur, which renders it more pliable and prevents it getting stiff on exposure to cold; or the belt may be made of a single thickness of india-rubber or gutta-percha in a sheet state and sulphurized as aforesaid, and then inclosed in a canvas cover. A strong outer casing D D, Figs. I and II, in which to hold the elastic belt is then built up (so to speak) around the tire by riveting together a series of circular segments of leather and bolting them to the tire in the manner shown in Fig. II. The segments at two of their edges *a a*, Fig. II, are made to overlap each other, as shown, and then secured in their place by passing bolts G G, Fig. II, through the tire and felly and making them fast by nuts *g g*, Fig. II. The elastic belt C, Fig. II, is then laid upon the portions of the segments D D, Fig. II, thus made fast to the tire, and secured in its place by bringing the two remaining and as yet unjoined edges *b b*, Fig. II, of the segments together over the casing and connecting them together by rivets F F, Fig. II. A pipe P, Fig. I, through which to inflate the elastic belt with air, is passed at one place through the tire of the wheel and fitted with an air-tight screw-cap.

I prefer distending the elastic belt with air, as being more suitable than anything else for the purpose; but it may be distended with various solid substances of an elastic quality—as, for instance, metallic springs, sulphurized pieces of caoutchouc, or gutta-percha or horse-hair or sponge.

If the elastic belt were first stuffed with horse-hair or sponge or other elastic materials and then inflated by blowing in air to a high degree of tension, the belt would be less liable to be cut by concussion between the tire of the wheel and the roadway. Instead, also, of the elastic belt being made in either of the modes aforesaid, it might be formed of a number of separate tubes of smaller dimensions clustered together and inclosed within a leather cover D. A wheel with a belt constructed in this manner is shown in Figs. III and IV, the former being a side view, partly in section, and the latter a cross-section. The tubes are nine in number and each of length sufficient to go round the wheel. They are represented as tied at the ends, but for greater convenience of inflation may be closed by screw-caps at one end. The whole are inclosed in a leather cover D. If the three tubes, which are shown in the cross-section, Fig. IV, as coming next the tire were filled with air more highly compressed than that contained in the tubes which come in contact with the ground, this would serve to graduate the resiliency of the belt in a manner highly favorable to the efficiency of its action.

Any undue displacement of the air at the bearing-points of the wheel may be prevented by tying the tubes across at distances of two or three feet apart, so that each tube shall be divided into a number of separate air-tight compartments; or instead of any of the preceding modes of construction the belt may be formed of separate and distinct sections, as shown in Figs. V and VI, each section having its own air-pipe P, in which case, the range of expansion and contraction being limited by the extent of the compartments, the belt must necessarily offer at each point of contact with the ground a greater degree of resistance to compression; and in some cases, where from the nature of the roadway frequent concussions are likely to take place, a flat strap or band of sulphurized caoutchouc or gutta-percha or other suitable elastic substance of the width of the tire and about half an inch in thickness might be interposed between the tire of the wheel and the elastic belt, so as to render it less liable to rupture in the event of its being jammed between the roadway and the tire.

Where the leather cover of the elastic belt is likely to be exposed to much tear and wear I propose to use a belt of the description shown on the cross-section, Fig. VI. Here one of the pieces D' is secured to the tire of the wheel by bolts or screws, and it is bent round and sewed or riveted to the other piece $D^2$. The edges of D' overlap the piece $D^2$, and the outer casing E is secured to those edges by strong leather thongs. This arrangement will permit of the ready removal of the outer casing E when worn and the substitution of a new casing without disturbing the elastic belt or its attachment to the wheel, and in all cases the outer casing D or E may be protected from wear by covering the outer surface with flat-headed metal rivets secured on the inside with small washers.

For common passenger-carriages the elastic belt will require to be about four or five inches in diameter and to be inflated to such an extent as to keep the tire of the wheel two and a half or three inches from the ground—a distance which, it is presumed, will be found sufficient to admit of the wheel passing over any stones or other matters projecting beyond the general level of any ordinary turnpike road without the solid tire coming in contact with them. In carriages to which these elastic belts are applied the springs now in use may be dispensed with. In wagons for the carriage of goods the belt ought to be made of stronger materials and of larger diameter than in the case of passenger-carriages, and the outer leather cover should be protected by flat-headed metal rivets secured by small washers, as aforesaid.

Wheels with elastic belts such as I have described may be used with great advantage on timber railways, especially if the modifications represented in Figs. VII and VIII are adopted. The wheels in this case might be of the common form, except they should have a greater width of tire given them and be without flanges. The carriages are proposed to be kept on the rails by guide-wheels K K, working on a shaft L, secured by stays to the carriages and acting on a raised rail M, laid between the lines of rails on which the bearing-wheels run. The rails R R are to be made of longitudinal beams of timber, say, twelve inches broad and six inches deep, cross-ties of timber T T are to connect the two longitudinal rails together, and to these cross-ties the longitudinal rail on which the guide-wheels act is to be fixed. I prefer employing guide-wheels to attaching flanges to the bearing-wheels; but the latter also may be used. To increase the bite of the driving-wheels of the locomotive, I insert in the outer cover of the elastic belt a large number of rivets with sharp conical heads. The drawing Fig. VIII shows a side view of a pair of railway-wheels on this plan for running on timber rails, and Fig. VII a cross-section and end elevation of the same.

The elastic belts are also peculiarly applicable to carriages propelled by steam on common roads. The comparatively small amount of power required to propel carriages the wheels of which are fitted with these belts, the steadiness of their motion, the absence of all jolting, and consequent security of the machinery from injury, the small damage the carriages will do to roads, the absence of nearly all noise, the high speed that may safely be attained, and the great gentleness of the motion will, I think, enable steam-carriages to be run on common roads with great advantage, both for carrying passengers and goods.

Among many minor applications which suggest themselves I may mention the great applicability of these elastic bearings for bath-chairs, rocking-chairs, and other like articles used commonly either in pleasure-grounds or within doors. In the common rocking-chair a rolling motion is obtained by resting the legs of the chair on two circular segments. In applying my elastic bearings to this chair I propose to make the circular segments on which the chair rolls about three inches wide on their bearing-surfaces and to secure to these segments an elastic tube of about two inches diameter, so as to interpose the tube between the segments and the floor, so that the chair would roll on and be supported by the elastic tube  I propose, further, to apply the elastic bearings to rollers for the removal of heavy bodies. Such rollers would be used in the same way that wood or iron rollers are now commonly used—that is, by being placed below the body which is to be moved. The advantage which rollers with elastic bearings would have over hard and metallic rollers is that a large number of them may be made to bear equally at the same time, even although the ways on which the body is being moved are not quite even.

Having now described the nature of my said invention and in what manner the same is to be performed, I declare that what I claim is—

1. The application of elastic bearings round the tire of carriage-wheels, as before described.
2. The application of similar elastic bearings to the surfaces of other rolling bodies, as before exemplified.

R. W. THOMSON.

Witnesses:
JNO. ALCOCK,
*Lincoln's Inn, London.*
JOSEPH MARQUETTE,
*Clerk in the Consulate of the U. States, London.*